United States Patent
Datar et al.

(10) Patent No.: US 7,873,621 B1
(45) Date of Patent: Jan. 18, 2011

(54) EMBEDDING ADVERTISEMENTS BASED ON NAMES

(75) Inventors: Mayur Datar, Santa Clara, CA (US); Ashutosh Garg, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 220 days.

(21) Appl. No.: 11/694,434

(22) Filed: Mar. 30, 2007

(51) Int. Cl.
  *G06F 17/00* (2006.01)
(52) U.S. Cl. .................. 707/706; 707/708; 707/721
(58) Field of Classification Search .............. 707/706, 707/708, 721
  See application file for complete search history.

(56) References Cited

U.S. PATENT DOCUMENTS

| 5,040,218 | A * | 8/1991 | Vitale et al. ............... 704/260 |
| 7,246,128 | B2 * | 7/2007 | Jordahl ......................... 1/1 |
| 2006/0020593 | A1 * | 1/2006 | Ramsaier et al. ............. 707/5 |
| 2009/0029687 | A1 * | 1/2009 | Ramer et al. ............ 455/414.3 |
| 2009/0204386 | A1 * | 8/2009 | Seligman et al. ............ 704/2 |

* cited by examiner

*Primary Examiner*—Sana Al-Hashemi
(74) *Attorney, Agent, or Firm*—Fish & Richardson P.C.

(57) ABSTRACT

The present disclosure includes a system and method for embedding advertisements associated with names. In some implementations, a method includes receiving a request for an advertisement to embed in a Web page identifying one or more search results. The search results are based, at least in part, on a name of an individual. One or more advertisements associated with the name of the individual are identified.

22 Claims, 3 Drawing Sheets

EMBEDDING ADVERTISEMENTS BASED ON NAMES

TECHNICAL FIELD

This invention relates to advertising.

BACKGROUND

Content delivery over the internet continues to improve every day. Computer users can receive e-mail, news, games, entertainment, music, books, and web pages all with a simple Internet connection (and with improved quality on a broadband connection). Internet users also have access to a plethora of services such as maps, shopping links, images, blogs, local search, satellite images, group discussions, hosted content, and e-mail. These service providers may track users' interactions with such services to determine associated metrics and/or modify these services based on such interactions to further enhance the user experience.

SUMMARY

The present disclosure includes a system and method for embedding advertisements associated with names. In some implementations, a method includes receiving a request for an advertisement to embed in a Web page identifying one or more search results. The search results are based, at least in part, on a name of an individual. One or more advertisements associated with the name of the individual are identified.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
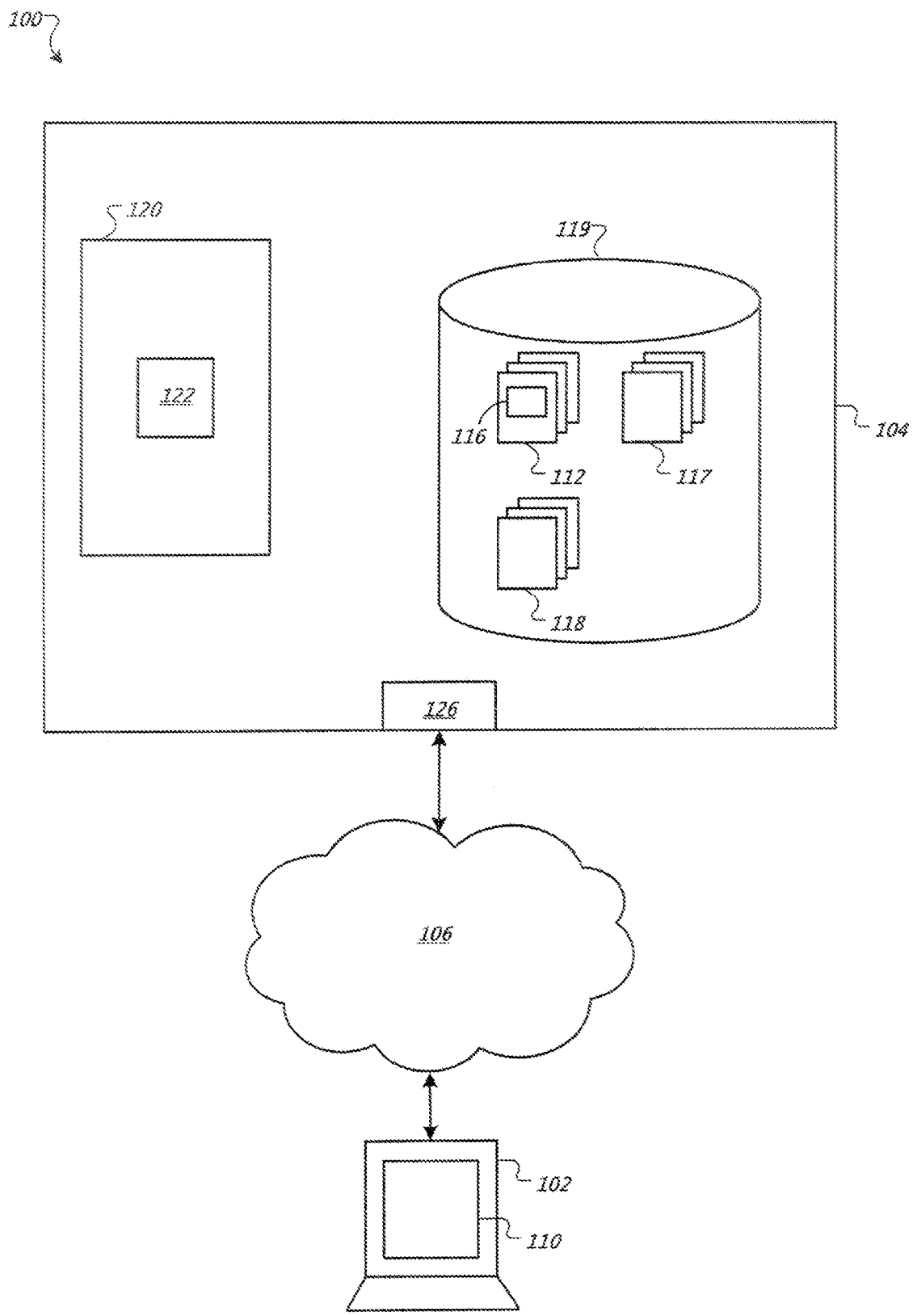
FIG. 1 is a is a block diagram illustrating an example system for providing name-based advertisements in accordance with some implementations of the present disclosure.

FIG. 1 illustrates an example system 100 for selecting advertisements based, at least in part, on search queries associated with names. For example, the system 100 may identify a search query for a person and select one or more advertisements for embedding in the search results based, at least in part, on the searched name. In some implementations, embedded name-based ads may include information associated with a specific individual and/or a group of individuals identified by the searched name(s). For example, the system 100 may select ads based on one or more of the following: name entered in a search query (e.g., a query targeting a specific person), names contained in the search results (e.g., from queries that are not named-based), or some combination of names from the search query and search results. For example, if a user employing personal computer enters a search query for a specific person (e.g., a friend named Sree Sriharikota), the system 100 may provide name-based embedded advertisements based on the name Sree Sriharikota. Such ads may be based on the individual's (e.g., Sree Sriharikota's) person profile. For example, a name-based ad for Sree may be based on information in a personal profile generated for Sree Sriharikota, such as Sree's name, age, birth date, income, gender, location, ethnicity, nationality, religion, marital status, occupation, professional interests, and preferences for music, TV and movies. For example, if Sree's person profile indicates that she is a wealthy professional women who likes classical music, the system 100 may, for example, provide embedded advertisements for expensive tickets to a nearby romantic opera.

In general, an individual's person profile may include one or more of the following: psychographic, demographic and/or behavioral. The category of psychographic variables may relate to the individual's personality traits (e.g., interests, attitudes, opinions, lifestyle and values). For example, an individual's religion and/or cultural background may be modeled in psychographic variables. The category of demographic variables may include age, gender and/or other statistical data. The category of behavioral variables may serve to define the individual's propensity to use specific products. For example, an individual's likelihood to buy certain quantities of name-brand merchandise may be represented by behavioral variables, such as brand loyalty and consumption rates, that may have been compiled, for example, from past purchases. When targeting ads based on profile information for specific individuals, the system 100 may use various combinations of psychographic, demographic and/or behavioral variables that are appropriate to the ad. For example, ads for products generally used by women in their seventies may be just as pertinent to members of that group regardless of their personality traits. In another example, the system 100 may target an ad for golf vacations in Arizona to retired men who are known to have visited Arizona in the past, as indicated by their person profiles.

In some implementations, the system 100 may, alternatively or in combination, employ one or more name-based profiles (e.g., based on etymology and/or anthroponymy) that include information associated with first names and/or surnames, such as geographic region, language, root information, etc. For example, the name-based profile may associate a surname such as Sriharikota with a remote region in India, while a surname such as McKeevechester may be associated with an obscure location in Scotland. In general, names may be popular names or rare names. Popular names may typically be more prevalent in certain parts of the world, or at least may be known to have originated from certain geographic areas. For example, the names Anderson and Erickson may be associated with people whose families originated in Europe. Popular names may be further categorized by gender because female names tend to differ from male names. For example, Bob may typically be associated with a male, and Mary with a female. Having the ability to differentiate names (e.g., by geographic area and/or gender) may provide the advantage of targeting ads to individuals who are generally more likely to respond to the ads. Additionally, aggregated profiles, based on groups of names, may help the system 100 target ads more effectively by presenting ads to individuals in those groups. For rare names, the system 100 may use information not readily available in existing person profiles. In some implementations, the system 100 may build person profiles for rare names using past activity on the Web provider and/or public profiles stored in social networking sites (e.g., Myspace, linkedin, hi5, friendstar, etc.). These profiles may be built in an offline manner based on the content crawled or stored in logs and may be further updated at query time based on the search results provided for an individual.

In some implementations, the system 100 may use identifying information from the name-based search results to select associated ads. For example, the name-based search query may generate search results containing information associated with the name such as information identifying their interest (e.g., triathalons), careers (e.g., research articles on robotic vision), as well as other information. In such a case, the system 100 may use frequently-occurring words contained in a subset of the search results (e.g., the top ten entries) to select one or more ads. For instance, if the top ten search results include several Web sites describing robotic toys, the system 100 may select one or more ads for local hobby or specialty shops that sell or service robots. In the case that several searches are being done on the same person, the system 100 may automatically generate one or more profiles for the specific individual in response to an event (e.g., request, a specified number of queries). For example; the system 100 may automatically generate a first profile including biographical information and a second profile including interest for a specific individual. In analyzing the associated search results, the system 100 may use the content on these web pages as well as any anchor text pointing to these web pages to generate a list of weighted keywords and phrases for this person. The system 100 may use techniques such as NLP and/or sentiment detection. In addition, the system 100 may use specialized rules to identify characteristics of a person. For example, the system 100 may include specialized rules to determine whether the person is a scholar (has a home page on a university site, has publications etc.) and/or an entrepreneur (is mentioned on company websites under senior management or board of directors etc.), is an actor (mentioned on IMDB pages) etc.

In some implementations, the system 100 may derive information for the person profiles by using contents from the search results, such as key words occurring frequently in the search results. In some implementations, the system 100 may generate profiles based, at least in part, on information included in social networking sites. The system 100 may query a plurality of social network sites (e.g., MySpace, Facebook) to retrieve publicly available information associated with a specific individual. Alternatively or in combination, the system 100 may receive information from public databases, personal Web sites and/or other publicly available information (e.g., court records, Driver-Motor-Vehicle records, SEC filings, criminal records). In analyzing the retrieved information, the system 100 may use NLP, sentiment detection to extract weighted keywords and phrases corresponding to interests, likes, dislikes etc. In some implementations, the system 100 aggregates such keywords and phrases across a plurality of publicly available sites such as social networking sites. In addition, the system 100 may use specialized rules to identify characteristics of a person represented in the public information. For example, the system 100 may include specialized rules to determine whether is in a high income bracket and, as a result, may be included in SEC filings.

When the search results include more than one name, the system 100 may use an aggregate of the names to provide targeted ads. For example, if most of the names in the search results are male names, the system 100 may select ads that are generally more tailored to males. In another example, if the names contained in the search results are determined by the system 100 to be related to sports figures, ads corresponding to sporting events and/or sporting goods may be selected. Such ad generation based on groups of names may use aggregate profiles that associate characteristics of groups of individuals with the types of ads to which they may have a higher probability of responding.

Name-based ads may include (among other things) primary content, secondary content, and/or sponsored content. For example, each ad may be a text element, a graphics element, a multimedia element, a network link to a second application, a network link to a remote module, an executable, or any other graphical or display element. In a more specific example, an ad may include or reference a publicly-available Web page (or portion thereof), an internal e-mail, the user's personal contact information, weather information, a profit and loss report of a company, an OLAP (on-line analytical processing) report, portion of a sales order, as well as many others.

At a high level, the system 100, in some implementations, includes a client 102 and a content server 104 coupled through a network 106. In this implementation, the client 102 includes a Graphical User Interface (GUI) 110 for displaying Web pages 112 including embedded ads 116 provided by the content provider 104. The content provider 104 includes a memory 119 and a processor 120. The memory 119 locally stores the Web pages 112, embedded ads 116, person profiles 117 for use in selecting ads based on personal traits, and named-based profiles 118 for use in selecting ads based on name and surname characteristics. The processor 120 includes a request engine 122 for processing request received from the network 106 (e.g., client 102).

Turning to a high level description of the operation of the illustrated tracking system 100, the client 102 transmits a request to the content provider 104 for a Web page 112 with embedded ads 116 for display through the GUI 110. In some implementations, the request may include a search request for third-party Web pages associated with specified search criteria such as one or more names of individuals. For example, the user may request content (e.g., in a Web search for a particular friend) and, in response to the request, the content provider 104 may dynamically generate a Web page 112 including search results. In response to the request, the content provider 104 identifies the Web page 112 and embedded ads 116 and transmits the identified Web page 112 and ads 116 to the client 102 through the network 106 for display through the GUI 110. The embedded ads 116 included with the search results may be associated with the searched names.

As for a more detailed description of the illustrated elements, the client 102 includes or executes at least one GUI 110 and comprises an electronic device (e.g., a computing device) operable to receive, transmit, process and store data associated with the system 100. While not illustrated, the system 100 may include any number of clients 102 communicably coupled to the content provider 104. Further, "client 102" and "user" may be used interchangeably as appropriate without departing from the scope of this disclosure. Moreover, for ease of illustration, the client 102 is described in terms of being used by one user, but many users may use one device (e.g., client 102) or that one user may use multiple devices without departing from the scope of this disclosure.

As used in this disclosure, the client 102 is any person, department, organization, small business, enterprise, or any other entity that may use or request others to use the system 100. The client 102 is intended to encompass a personal computer, touch screen terminal, workstation, network computer, kiosk, wireless data port, smart phone, personal data assistant (PDA), cellular device, one or more processors within these or other devices, or any other suitable electronic device used by a user viewing Web pages 112 from the content provider 104. For example, the client 102 may be a PDA operable to wirelessly connect with an external or unsecured network. In another example, the client 102 may comprise a laptop that includes an input device, such as a keypad, touch screen, mouse, or other device that may accept information, and an output device that conveys information from the content provider 104 (e.g., advertisements, search results), including digital data, visual information, or the GUI 110. Both the input device and output device May include fixed or removable storage media such as a magnetic computer disk, CD-ROM, or other suitable media to both receive input from and provide output to users of the client 102 through the display, namely the client portion of the GUI 110.

The GUI 110 comprises a graphical user interface operable to allow the user of the client 102 to interface with at least a portion of the system 100 for any suitable purpose, such as viewing Web pages 112 that may include advertisements, search results, hyperlinks to third-party Web sites, and other links. Generally, the GUI 110 provides the particular user with an efficient and user-friendly presentation of data provided by or communicated within the system 100. The GUI 110 may comprise a plurality of customizable frames or views having interactive fields, pull-down lists, and/or buttons operated by the user. For example, the GUI 110 is operable to display certain ads 116 in a user-friendly form based on the user context and the displayed data. The term graphical user interface may be used in the singular or in the plural to describe one or more graphical user interfaces and each of the displays of a particular graphical user interface. The GUI 110 contemplates any graphical user interface, such as a generic Web browser or touch screen, that processes information in the system 100 and presents the results to the user. The content provider 104 may accept data from the client 102 using, for example, the Web browser (e.g., Microsoft Internet Explorer, Mozilla Firefox) and return the appropriate responses (e.g., HTML, XML) to the browser using the network 106.

The content provider 104 comprises an electronic device operable to receive, transmit, process and store data associated with the system 100. The system 100 may be implemented using devices or computers other than servers, as well as a server pool. Indeed, the content provider 104 may be any computer or processing device such as, for example, a blade server, general-purpose personal computer (PC), Macintosh, workstation, Unix-based computer, or any other suitable device. In other words, the system 100 may include computers other than general purpose computers as well as computers without conventional operating systems. In computing device implementations, the content provider 104 may be adapted to execute any operating system including Linux, UNIX, Windows Server, or any other suitable operating system. In certain implementations, the content provider 104 may also include or be communicably coupled with a Web server and/or a DNS server.

As mentioned above, the content provider 104, in this implementation, includes the memory 119 and the processor 120. The memory 119 may be a local memory and include any memory or database module and may take the form of volatile or non-volatile memory including, without limitation, magnetic media, optical media, random access memory (RAM), read-only memory (ROM), removable media, or any other suitable local or remote memory component. In the illustrated implementation, the memory 119 includes the Web pages 112, ads 116, person profiles 117, and name-based profiles 118. In some implementations, the Web pages 112, ads 116, person profiles 117, and name-based profiles 118 may reside in the memory in a format that is different from what is transmitted to the user. For instance, the Web pages 112 and/or ads 116 may be stored in an inverted index, which may facilitate searches. Local memory 119 may also include any other appropriate data such as VPN applications or services, firewall policies, a security or access log, print or other reporting files, HTML files or templates, data classes or object interfaces, child software applications or sub-systems, and others.

The Web pages 112 comprise displays through which information may be presented to users of the clients 102. In some implementations, the Web pages 112 includes search results displayed through GUI 110. In general, the Web pages 112 include any machine readable and machine storable work product that may generate or be used to generate a display through the GUI 110. The Web pages 112 may be a file, a combination of files, dynamically generated by the content provider 104 based on suitable parameters user profile, user demographics, previous selections of the user), one or more files with, embedded links to other files, etc. The Web pages 112 may include text, audio, image, video, animation, and other attributes. In short, the Web pages 112 comprise any source code or object code for presenting one or more embedded name-based ads 116. In some implementations, the embedded name-based ad 116 may include a hyperlink identifying a third-party ad associated with, for example, a specific product and/or service. In certain implementations, the Web pages 112 may be formatted, stored, or defined as various data structures in text files, eXtensible Markup Language (XML) documents, Virtual Storage Access Method (VSAM) files, flat files, Btrieve files, comma-separated-value (CSV) files, internal variables, or one or more libraries. For example, a particular Web page 112 may merely be a pointer to a third party ad stored remotely. In short, Web pages 112 may comprise one table or file or a plurality of tables or files stored on one computer or across a plurality of computers in any appropriate format. Indeed, some or all of Web pages 112 may be local or remote without departing from the scope of this disclosure and store any type of appropriate data.

Ads 116 may include any parameters, pointers, variables, algorithms, instructions, rules, files, links, or other data for easily providing secondary content. It will be understood that while user context may be described in terms of "combinations," such various user context data may be stored or processed using at least one data structure, object, record or file. In certain implementations, ads 116 (or pointers thereto) may be stored in one or more tables in a relational database described in terms of SQL statements or scripts. In certain implementations, ads 116 may be formatted, stored, or defined as various data structures in text files, XML documents, VSAM files, flat files, Btrieve files, CSV files, internal variables, or one or more libraries. For example, a particular ad 116 may merely be a pointer to a third party ad stored remotely. In another example, a particular ad 116 may be an internally stored advertisement for a tightly coupled service. In short, ads 116 may comprise one table or file or a plurality of tables or files stored on one computer or across a plurality of computers in any appropriate format. Indeed, some or all of ads 116 may be local or remote without departing from the scope of this disclosure and store any type of appropriate data.

Person profiles 117 include one or more entries or data structures operable to identify information associated with a specific individual. For example, a person profile 117 may identify one or more of the following: the person's name, age, birth date, income, gender, location, ethnicity, nationality, religion, marital status, family size, occupation, professional interests, credit rating, music preferences, TV preferences, movies preferences, and/or other information. In addition, person profiles 117 may include physical attributes, statistical data, demographics, hobbies, interests, marital status, etc. In some implementations, a plurality of person profiles 117 are associated with the same individual, and in this case, each profile 117 may be used in a slightly different process. In some implementations, some characteristics in a person profile 117 may be weighted higher than other characteristics. This may provide the advantage of allowing the system 100 to target ads to individuals based on particular attributes that may be more important than other attributes. For example, the system 100 may determine that an individual's interest in golf is greater than the individual's interest in music if the individual has recently performed more search queries related to golf. In such a case, the system 100 may target ads related to golf because the individuals' interest in golf is higher than music.

Name-based profiles 118 include one or more entries or data structures operable to identify likely personal characteristics associated with a searched name. For example, a name-based profile 118 for "Erickson" may differ from that for "Nguyen" based on the general cultural and ethnic differences between them. In general, a name-based profile 118 may include some of the same types of information contained in a person profile 117 without the elements that pertain to specific individuals. For example, while a particular name-based profile 118 may not include specific birthdates, the name-based profile 118 may contain time-based information regarding the number of generations that a family surname has populated an area (e.g., the United States). In another example, name-based profiles 118 may contain statistics or other metadata representing the population size of the group comprising that name. This information may also be further differentiated by other variables, such as geographic area. For example, the Kowalskis in the Chicago area may total thousands of individuals, while the Minnesota Kowalskis may number in the hundreds. Each surname in different geographic areas may have a vastly different name-based profile 118 by which the system 100 may target ads. In some implementations, the name-based profile 118 may include one or more of the following: spoken language, geography, mean/median income, political affiliations, prominent businesses, and/or others.

Processor 120 executes instructions and manipulates data to perform operations of content provider 104. Although FIG. 1 illustrates a single processor 120 in the content provider 104, multiple processors 120 may be used according to particular needs, and reference to processor 120 is meant to include multiple processors 120 where applicable. In the illustrated implementation, the processor 120 executes the request engine 122. The request engine 122 may be of the form of software, for example, operable to provide the Web pages 112 to the client 102 in accordance with a request. As mentioned above, the request may include a search request or a request for a specific Web page 112. In some implementations, the request engine 122 dynamically generates a Web page 112 based on one or more parameters. In this case, the request engine 122 may identify one or more parameters associated with the user, the client 102, and/or other information associated with the system 100. For example, the request engine 122 may dynamically generate a Web page 112 based on previous user actions such as previous selections of the user. The previous selections may be identified, at least in part, on types of content, keywords associated with previous content, actions associated with the previously selected content (e.g., viewing time) and/or other parameters. The request engine 122 may transmit Web page 112 including the embedded ad 116 to the client 102 using network 106. In some implementations, the request engine 122 may transmit to a tracking server information associated with the request (e.g., link identifier, user, time, date). While illustrated as a module of the content provider 104, the request engine 122 may be integrated into another network device that manages ad requests for the network 106.

Regardless of the particular implementation, "software" may include software, firmware, wired or programmed hardware, or any combination thereof as appropriate. Indeed, request engine 122 may be written or described in any appropriate computer language including C, C++, Java, J#, Visual Basic, assembler, Perl, PEP, as well as others. It will be understood that while the request engine 122 and the selection engine 124 are illustrated in FIG. 1 as including individual modules, the request engine 122 and/or the selection engine 124 may include numerous other sub-modules or may instead be a single multi-tasked module that implements the various features and functionality through various objects, methods, or other processes. Further, while illustrated as internal to the content provider 104, one or more processes associated with the request engine 122 may be stored, referenced, or executed remotely. Moreover, the request engine 122 may be a child or sub-module of another software module or enterprise application (not illustrated) without departing from the scope of this disclosure.

The content provider 104 may also include an interface 126 for communicating with other systems, such as the client 102, over the network 106 in a client-server or other distributed environment. In certain implementations, the content provider 104 receives data from internal or external senders through the interface 126 for storage in local memory 119 and/or processing by processor 120. Generally, the interface 126 comprises logic encoded in software and/or hardware in a suitable combination and operable to communicate with the network 106. More specifically, the interface 126 may comprise software supporting one or more communications protocols associated with communications over the network 106 or hardware operable to communicate physical signals.

The network 106 facilitates wireless or wireline communication between the content provider 104 and any other local or remote computer, such as the client 102. The network 106 may be all or a portion of an enterprise or secured network. While illustrated as single network, the network 106 may be a continuous network logically divided into various sub-nets or virtual networks without departing from the scope of this disclosure, so long as at least portion of the network 106 may facilitate communications of the ads 116 between the content provider 104 and the client 102. In some implementations, the network 106 encompasses any internal or external network, networks, sub-network, or combination thereof operable to facilitate communications between various components in the system 100. The network 106 may communicate, for example, Internet Protocol (IP) packets, Frame Relay frames, Asynchronous Transfer Mode (ATM) cells, voice, video, data, and other suitable information between network addresses. The network 106 may include one or more local area networks (LANs), radio access networks (RANs), metropolitan area networks (MANS), wide area networks (WANs), all or a portion of the global computer network known as the Internet, and/or any other communication system or systems at one or more locations.

Figure 2:
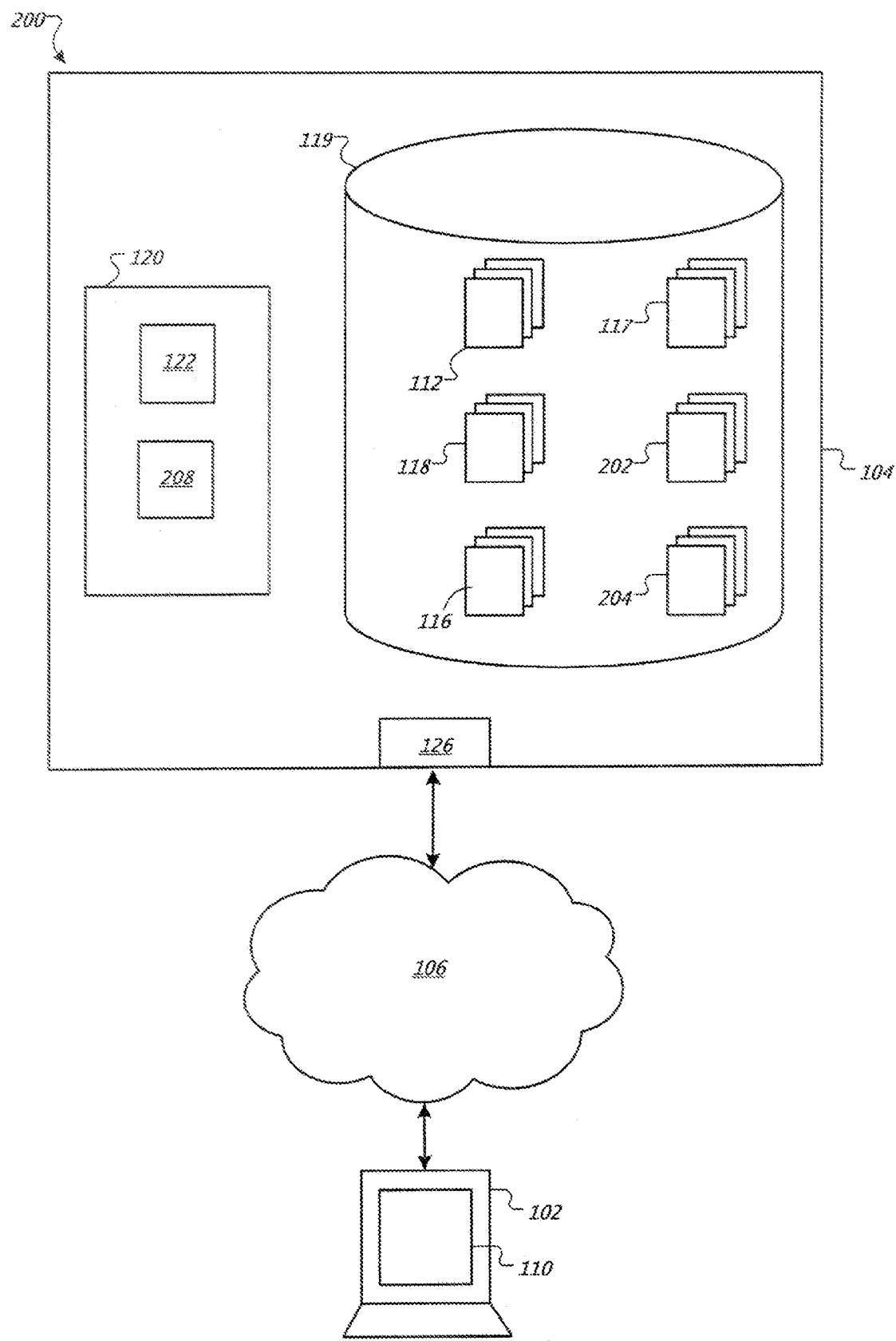
FIG. 2 is a block diagram illustrating an example system including name-based advertisements in accordance with some implementations of the present disclosure.

FIG. 2 illustrates a system 200 for selecting ads 116 based, at least in part, on search queries for names. In the illustrated implementation, the content server 104 comprises a search engine and will be referred to as the search engine 104 in describing system 200. In general, the search engine 104 receives a request to identify Web sites in accordance with specified search criteria and transmits a Web page 112 including links to such Web sites with one or more embedded ads 116. In the case that the search criteria includes a name, the search engine 104 may identify one or more ads 116 associated with the searched name for embedding in Web pages presenting the search results.

In addition to the elements described with respect to FIG. 1, the memory 119 includes search indexes 202 for associating search criteria with Web sites and selection criteria 204 for associating ads 116 with searched names. The processor 120 includes a selection engine 208 for selecting one or more ads using the selection criteria 204. As for high-level description of the operation of the system 200, the client 102 transmits a search request to the search engine 104 to identify Web sites associated search criteria including one or more names. The request engine 122 identifies third-party Web sites using one or more search indexes 202 and the search request. The selection engine 208 identifies information associated with the one or more names using the person profiles 117, named-based profiles 118, and/or the search results. In addition, the selection engine 208 selects one or more ads 116 using the identified information and the selection criteria 204. In connection with selecting the ads 116, the request engine 122 transmits the Web page 112 including the ads 116 to the client 102 for displaying the ads 116 through the GUI 110.

Turning to a more detailed description, the search index 202 includes any parameters, variables, policies, algorithms, instructions, settings, or rules for mapping one or more search criteria to a Web site. For example, the search index 202 may include a table that maps keywords to specific Web sites. In addition, the search index 202 may include one or more of the following data structures: suffix trees, tries, inverted indices, citation indices, Ngram indices, terminal document matrices, and/or other structures or parameters for mapping criteria to one or more Web sites. Each search index 202 may be associated with a specific criterion or multiple criteria may be associated with a single search index 202. The index 202 may be stored in one or more tables stored in a relational database described in terms of SQL statements or other scripts. In other implementations, the indexes 202 may be formatted, stored, or defined as various data structures in text files, XML documents, VSAM files, flat files, Btrieve files, CSV files, internal variables, or one or more libraries. In short, the indexes 202 may comprise one table or file or a plurality of tables or files stored on one computer or across a plurality of computers in any appropriate format. Moreover, the indexes 202 may be local or remote without departing from the scope of this disclosure and store any type of appropriate data.

The selection criteria 204 may include any parameters, variables, algorithms, instructions, rules, objects or other directives for selecting ads 116. For example, the selection criteria 204 may identify current usage guidelines for selecting the ads 116. In some implementations, the selection criteria 204 may map or otherwise associate one or more keywords to one or more ads 116. In addition, the selection criteria 204 may include mathematical and/or logical expressions for selecting ads 116 based on any appropriate parameter. Alternatively or in addition to a set guideline, the selection, criteria 204 may include different criteria based, at least in part, on other aspects such as periods of time, user information, content of the Web site associated with an ad 116, and/or others. For example, the selection criteria 204 may include criteria for selecting the ad 116 during specified holidays (e.g., Christmas) and/or criteria for different aspects of a user (e.g., location, native language, demographics). In short, the selection criteria 204 may include any appropriate information for selecting ads 116.

As mentioned above, the processor includes the request engine 122 and the selection engine 208. The request engine 122 may be any suitable software that determines search results based, at least in part, on a search request. For example, the request engine 122 may identify one or more Web sites by comparing search criteria to one or more search indexes 202. In general, the request engine 122 may perform one or more of the following functions: receive a search request including one or more criteria, identify the search criteria using the search request, identify one or more search indexes 202 associated with the search criteria, identify one or more Web sites using the search indexes 202 and the search criteria, and/or generate a Web page 112 identifying the search results.

The selection engine 208 may be any suitable software, for example, operable to identify one or more ads 116 associated with searched names. For example, the selection engine 208 may initially identify selection criteria 204 information associated with searched names based, at least in part, on person profiles 217, name-based profiles 218, and/or the Web sites identified by the request engine 122. Using the identified information, the selection engine 208 may select or otherwise identify one or more ads 116 for presenting with the search results. As mentioned above, the selection engine 208 may select ads 116 based on names contained in the search results. In some implementations, the selection engine 208 may use the person profiles 117 and/or name-based profiles 118 to identify ads 116. In comparing the search criteria to the one or more selection criteria 204, the selection engine 208 may determine associations between keywords and one or more Web sites.

In one aspect of operation, the client 102 transmits, to the search engine 104, a request to identify Web sites associated with specified search criteria including one or more names of individuals. In response to at least the request, the request engine 122 identifies one or more search indexes 202 in accordance with the search criteria and, using these search indexes, identifies Web sites associated with the search criteria. In connection with generating the Web page 112 including one or more hyperlinks, the selection engine 208 identifies information associated with the searched names. For example, the selection engine 208 may identify information using the search results, one or more person profiles 117, and/or one or more named-based profiles 118. Using the identified information, the selection engine 208 selects one or more ads 116 in accordance with selection criteria 204. The request engine 122 generates the Web page 112 including the selected ads 116. The request engine 122 transmits the Web page 112 to the client 102 for display through GUI 110.

In some implementations, the system 100 may employ one or more thresholds for determining, for example, if search requests based on the name of an individual are sufficient for creating one or more personal profiles 117 and/or name-based profiles 118. For example, the system 100 may generate profiles for someone named Iwanna Karlandcyzk only after the number of queries has reached a predetermined threshold (e.g., 1000 or more). The system 100 may also wait until a sufficient amount of personal information is available in order to build suitable person profiles 117 and/or name-based profiles 118. In some implementation, there may exist several types of thresholds for determining when and how to generate and/or update profiles. For example, the system may use a smaller threshold (e.g., 100 search results corresponding to a person name) when determining the point at which to update profiles 117 and/or 118.

Figure 3:
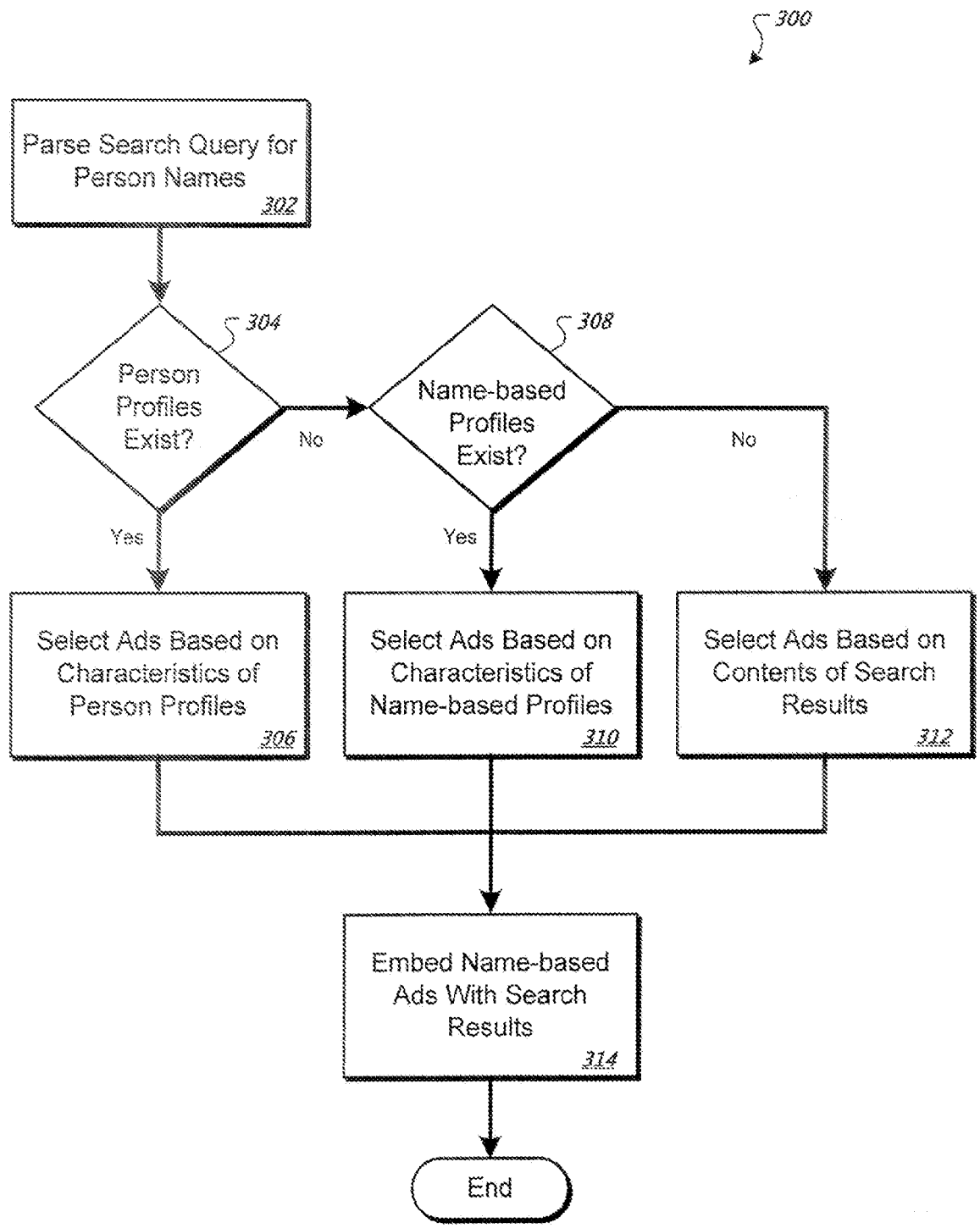
FIG. 3 is a flow diagram illustrating an example method for providing name-based advertisements in the system of FIG. 2.

FIG. 3 is a flow chart illustrating an example method 300 for selecting name-based advertisements for embedding in Web page presenting search results. Generally, method 300 describes an example technique where advertisements are selected for embedding in Web page search results in accordance with selection criteria. System 100 contemplates using any appropriate combination and arrangement of logical elements implementing some or all of the described functionality.

Method 300 begins at step 302 where the search query are parsed for person names. For example, a name may be contained in the search query executed by a user of client 102. At step 304, the system determines if one or more person profiles exist for the person name(s) identified in step 302. For example, if the user submits a search query for Jane Doe, the system may determine if one or more person profiles 117 exist for Jane Doe. If person profiles are found to exist at decisional step 304, then at step 306, ads are selected based on the characteristics of the personal profiles. Continuing the example above, the system may select one or more ads that match the characteristics of Jane Doe stored in person profiles 117. In particular, if Jane Doe likes to sew and enjoys sports, an ad may be selected by the system 100 for nearby fabric stores having sales on sport-themed material.

If person profiles are found not to exist at decisional step 304, then at step 308, the system determines if name-based profiles exist. For example, if the user's query produces search results having a name (e.g., Sophie Erickssonn) for which no person profiles 117 exist, the system may check for the name-based profiles for Sophie and/or Erickssonn. If name-based profiles are found to exist at decisional step 308, then at step 310, the identified name-based profiles are used to identify name-based ads. For example, the system 100 may determine that Sophie is a female name and Erickssonn is a Swedish name. Using such information, the system may identify name-based ads that may be of interest to Scandinavian woman.

If name-based profiles do not exist at decisional step 308, then at step 312, the system selects ads based on words contained in the search results. For example, if the search results returned to the user of the client 102 contain several Web sites including the identified name, then the system 100 may use frequently-occurring words found in a subset of the search results (e.g., the top ten entries) to select ads for presenting with the search results. For example, if the top ten search results make numerous references to robotic vision, the system 100 may select ads associated with robots for presenting with the search results.

A number of embodiments of the invention have been described. Nevertheless, it will be understood that various modifications may be made without departing from the spirit and scope of the invention.

What is claimed is:

1. A computer-implemented method for providing advertisements based on names, comprising:
   receiving a request for an advertisement to embed in a Web page identifying one or more search results, the search results responsive to a user-submitted search query containing a name of an individual;
   identifying one or more etymology profiles associated with the name, the etymology profiles including characteristics of persons derived from an etymology of the name; and
   selecting, by a processor, one or more advertisements using the characteristics of persons included in the one or more etymology profiles.

2. A system for providing advertisements based on names, comprising:
   one or more processors;
   memory coupled to the one or more processors and storing instructions which, when executed by the one or more processors, cause the one or more processors to perform operations comprising:
      receiving a request for an advertisement to embed in a Web page identifying one or more search results, the search results responsive to a user-submitted search query that includes a name of an individual;
      identifying one or more name-based profiles associated with the name, the name-based profiles including characteristics of persons derived from the name;
      selecting one or more advertisements based on the characteristics of persons included in the one or more name-based profiles.

3. A computer-readable medium having instructions stored thereon, which, when executed by one or more processors, cause the processors to perform operations comprising:
   receiving a request for an advertisement to embed in a Web page identifying one or more search results, the search results responsive to a user-submitted search query that includes a name of an individual;
   identifying one or more name-based profiles associated with the name, the name-based profiles including characteristics of persons derived from the name;
   selecting one or more advertisements based on the characteristics of persons included in the one or more name-based profiles.

4. A computer-implemented method for providing advertisements based on names, comprising:
   receiving a request for an advertisement to embed in a Web page identifying one or more search results, the search results responsive to a user-submitted search query that includes a name of an individual;
   identifying one or more name-based profiles associated with the name, the name-based profiles including characteristics of persons derived from the name;
   selecting, by a processor, one or more advertisements based on the characteristics of persons included in the one or more name-based profiles.

5. The system of claim 2, wherein the operations further comprise:
   identifying one or more person profiles including information associated with a specific person based, at least in part, on the name; and
   identifying the one or more advertisements using the one or more person profiles and the one or more name-based profiles.

6. The system of claim 2, wherein the one or more name-based profiles include one or more etymology profiles associated with the name and the characteristics of persons in the etymology profiles are derived from an etymology of the name.

7. The system of claim 2, wherein the operations further comprises:
   identifying information included with one or more search results based on the name; and
   identifying the one or more advertisements using the information and the one or more name-based profiles.

8. The system of claim 2, wherein the operations further comprise:
   determining search queries containing the name satisfy a threshold;
   identifying information included in one or more search results based, at least in part, on the name in response to at least the threshold being satisfied; and
   generating the one or more name-based profiles associated with the name based, at least in part, on the identified information.

9. The system of claim 2, wherein the operations further comprise:
   identifying, from one or more third-party Web sites, publicly-available information associated with specific individuals having the name;
   generating a person profile for the specific individual based, at least in part, on the publicly-available information; and
   identifying the one or more advertisements using the person profile and the one or more name-based profiles.

10. The computer-readable medium of claim 3, wherein the operations further comprise:
    identifying one or more person profiles including information associated with a specific person based, at least in part, on the name; and
    identifying the one or more advertisements using the one or more person profiles and the one or more name-based profiles.

11. The computer-readable medium of claim 3, wherein the one or more name-based profiles include one or more etymology profiles associated with the name and the characteristics of persons in the etymology profiles are derived from an etymology of the name.

12. The computer-readable medium of claim 3, wherein identifying one or more advertisements based on one or more name-based profiles comprises:
    identifying information included with one or more search results based on the name; and
    identifying the one or more advertisements using the information and the one or more name-based profiles.

13. The computer-readable medium of claim 3, wherein the operations further comprise:
    determining whether search queries containing the name satisfy a threshold;
    identifying information included in one or more search results based, at least in part, on the name in response to at least the threshold being satisfied; and
    generate the one or more name-based profiles associated with the name based, at least in part, on the identified information.

14. The computer-readable medium of claim 3, wherein the operations further comprise:
    identifying, from one or more third-party Web sites, publicly-available information associated with specific individuals having the name;
    generating a person profile for the specific individual based, at least in part, on the publicly-available information; and
    identifying the one or more advertisements using the person profile and the one or more name-based profiles.

15. The method of claim 4, further comprising:
    identifying one or more person profiles including information associated with a specific person based, at least in part, on the name; and
    identifying the one or more advertisements using the one or more person profiles and the one or more name-based profiles.

16. The method of claim 4, wherein the one or more name-based profiles include one or more etymology profiles associated with the name and the characteristics of persons in the etymology profiles are derived from an etymology of the name.

17. The method of claim 4, further comprising:
    identifying information included with one or more search results based on the name; and
    identifying the one or more advertisements using the information and the one or more name-based profiles.

18. The method of claim 4, further comprising:
    determining whether search queries containing the name satisfy a threshold;
    identifying information included in one or more search results based, at least in part, on the name in response to at least the threshold being satisfied; and
    generating the one or more name-based profiles associated with the name based, at least in part, on the identified information.

19. The method of claim 4, further comprising:
    identifying, from one or more third-party Web sites, publicly-available information associated with a specific individual having the name;
    generating a person profile for the specific individual based, at least in part, on the publicly-available information; and
    identifying the one or more advertisements using the person profile and the one or more name-based profiles.

20. The system of claim 9, wherein the one or more third-party Web sites comprise one or more social networking Web sites.

21. The computer-readable medium of claim 14, wherein the one or more third-party Web sites comprise one or more social networking Web sites.

22. The method of claim 19, wherein the one or more third-party Web sites comprise one or more social networking Web sites.

* * * * *